US009614922B2

(12) United States Patent
Limburn et al.

(10) Patent No.: US 9,614,922 B2
(45) Date of Patent: Apr. 4, 2017

(54) SWITCHING OF ELECTRONIC SOCIAL PRESENCE BETWEEN DEVICES

(71) Applicant: INTERNATIONAL BUSINESS MACHINES CORPORATION, Armonk, NY (US)

(72) Inventors: Jonathan Limburn, Southampton (GB); Graham White, Alton (GB)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 14/512,721

(22) Filed: Oct. 13, 2014

(65) Prior Publication Data

US 2015/0113048 A1    Apr. 23, 2015

(30) Foreign Application Priority Data

Oct. 17, 2013    (GB) .................................... 1318349.6

(51) Int. Cl.
*H04L 29/08*    (2006.01)
*H04W 4/02*    (2009.01)

(52) U.S. Cl.
CPC ............ *H04L 67/24* (2013.01); *H04L 67/148* (2013.01); *H04W 4/023* (2013.01)

(58) Field of Classification Search
CPC ........................................ H04L 67/24
USPC ........................................ 709/203
See application file for complete search history.

(56) References Cited

U.S. PATENT DOCUMENTS

| 7,487,248 | B2 * | 2/2009 | Moran | ................... H04L 67/14 709/206 |
| 8,060,533 | B1 * | 11/2011 | Wheeler | ............. G06Q 10/109 707/791 |
| 8,131,281 | B1 * | 3/2012 | Hildner | .............. H04L 41/0806 455/418 |
| 8,224,894 | B1 | 7/2012 | Parks et al. | |
| 8,461,803 | B2 * | 6/2013 | Cohen | ................... A47L 9/2857 320/109 |

(Continued)

FOREIGN PATENT DOCUMENTS

GB    2490800    11/2012

OTHER PUBLICATIONS

Windows Apps Team, "Roaming app data and the user experience", 2016.*

(Continued)

*Primary Examiner* — O. C. Vostal
(74) *Attorney, Agent, or Firm* — Law Office of Jim Boice

(57) ABSTRACT

A processor implemented method, system, and/or computer program product switches an electronic social presence between a first device and a second device. An electronic signal indicating a signing in to a social presence server by the first device is received. A determination is made as to whether the first device and the second device are physically located farther apart than a predetermined distance. In response to determining that the first device and the second device are physically located farther apart than the predetermined distance, the first device signs out from the social presence server, the second device signs in to the social presence server, and a history associated with the electronic social presence is transferred from the first device to the second device.

10 Claims, 4 Drawing Sheets

(56) References Cited

U.S. PATENT DOCUMENTS

| | | | | |
|---|---|---|---|---|
| 8,503,340 B1* | 8/2013 | Xu | | H04W 84/12 370/310 |
| 8,554,647 B1* | 10/2013 | Grigg | | G06Q 40/02 701/469 |
| 8,810,392 B1* | 8/2014 | Teller | | G08B 21/24 235/385 |
| 8,908,580 B2* | 12/2014 | Shen | | H04W 36/14 370/310 |
| 9,319,968 B2* | 4/2016 | Montemurro | | H04W 48/16 |
| 2006/0153198 A1 | 7/2006 | Chadha | | |
| 2007/0124721 A1* | 5/2007 | Cowing | | G06F 17/30041 717/100 |
| 2008/0133757 A1 | 6/2008 | Etelapera | | |
| 2008/0305771 A1* | 12/2008 | Yajima | | H04M 1/66 455/411 |
| 2009/0157799 A1 | 6/2009 | Sukumaran et al. | | |
| 2009/0264070 A1* | 10/2009 | Lim | | G06Q 30/0261 455/41.2 |
| 2011/0191692 A1* | 8/2011 | Walsh | | G06F 3/00 715/752 |
| 2012/0209654 A1* | 8/2012 | Romagnino | | G06Q 10/06 705/7.27 |
| 2012/0214461 A1* | 8/2012 | Raghavan | | H04M 1/72569 455/418 |
| 2012/0220289 A1* | 8/2012 | Bellmare | | G08B 13/1427 455/423 |
| 2013/0054698 A1* | 2/2013 | Lee | | G06Q 30/0259 709/204 |
| 2013/0141514 A1 | 6/2013 | Chao et al. | | |
| 2013/0231138 A1* | 9/2013 | Hans | | G06Q 30/02 455/456.3 |
| 2013/0265232 A1* | 10/2013 | Yun | | G09G 3/3208 345/158 |
| 2013/0288692 A1* | 10/2013 | Dupray | | H04W 64/00 455/450 |
| 2014/0025504 A1* | 1/2014 | Butler | | G07F 17/16 705/14.64 |
| 2014/0087660 A1* | 3/2014 | Kim | | H04L 12/282 455/41.1 |
| 2014/0156538 A1* | 6/2014 | Kandasamy | | G06Q 30/016 705/304 |
| 2014/0280981 A1* | 9/2014 | Singhal | | H04L 67/02 709/227 |
| 2015/0026261 A1* | 1/2015 | Shimakawa | | G06Q 10/10 709/204 |
| 2015/0072662 A1* | 3/2015 | Chandrasekaran | . | H04W 76/043 455/414.1 |
| 2015/0099469 A1* | 4/2015 | Goldstein | | H04L 67/24 455/41.2 |
| 2015/0178362 A1* | 6/2015 | Wheeler | | G06F 9/44505 707/639 |
| 2015/0228419 A1* | 8/2015 | Fadell | | G08B 17/00 307/112 |
| 2015/0294543 A1* | 10/2015 | Ricks | | G08B 27/003 340/541 |
| 2015/0379624 A1* | 12/2015 | Poornachandran | .... | G06Q 30/08 705/80 |
| 2016/0042473 A1* | 2/2016 | Danielli | | G06Q 30/0207 705/319 |
| 2016/0061613 A1* | 3/2016 | Jung | | G01C 21/3632 701/49 |
| 2016/0080510 A1* | 3/2016 | Dawoud Shenouda Dawoud | | H04L 47/808 709/225 |

OTHER PUBLICATIONS

Ip.com et al., "A method and system for automatically switching user's sessions among devices based on the Bluetooth protocol", 2011.*

Dubey et al., "A Method for Supporting Automatic Switching and Session Transfer Over Multiple Networks", 2013.*

WhatIs.com, "Near Field Communication (NFC)", 2016.*

Anonymous, "A method and system for automatically switching user's sessions among devices based on the Bluetooth protocol", ip.com, IPCOM000206820D, May 9, 2011, pp. 1-4.

* cited by examiner

SWITCHING OF ELECTRONIC SOCIAL PRESENCE BETWEEN DEVICES

BACKGROUND

The present invention relates to switching of electronic social presence between devices and more particularly to the switching of electronic social presence between devices responsive to a separation between the devices.

The use of multiple different devices by a single individual to access social media and instant messaging, collectively called electronic social presence, is becoming more widespread. Although referred to as electronic social presence, the usage is not restricted to social purposes, but is also used for business purposes. In the workplace, the need to stay in contact with colleagues throughout the day and outside working hours has grown. Technologies exist to allow an individual to be constantly contactable through instant messaging on whichever device that individual is using at that time of the day. Typically, a user will be sat at a desk using a laptop whilst being "available" for instant messaging. The same user may leave their desk to attend meetings. For the duration of this period away from their desk the need to be "available" for instant messaging still exists. Existing technologies allow this to happen through the provision of instant messaging on mobile devices such as phones and tablets.

The use of instant messaging on various devices and platforms to tackle the need to be in constant contact is not new, however switching between devices is currently a problem. It is presently possible to log in from multiple devices and have an electronic social presence attempt to follow the individual by sending new chat notifications to the "most recently used device" where "most recently used" is an algorithm built into the application itself. An example of an application which does this is Google™ Talk. It is also presently possible to send notifications to all the devices on which an individual is logged in. An example of this is the Skype™ application. Sending notifications to a most recently used or sending notifications to all devices is not an optimal way of resolving the problem of allowing an individual to be constantly contactable. Known prior art discloses a method for changing a first device into a second device during a session. Information on the session is transmitted from the first device to the second device. Based on the received information, the second device is connected to the session and the first device is disconnected from the session such that the session is maintained. No state data for the session is transferred from the first device to the second device.

Known prior art discloses a method for uninterrupted communication sessions including automatically detecting, at a first device associated with a first user, a second device associated with a first user, and creating, at the first device associated with the first user, a network connection between the first and second devices, wherein the first device operates in a first medium and the second device operates in a second medium. A communication session may be transferred from the first device operating in the first medium to the second device operating in the second medium. Peer to peer communication between the first and second devices is used. If the network connection between the first device and the second device is lost before the communication session has been transferred, then the transfer will not take place. This may happen if the second device moves outside the operating range of a wireless network connection.

Known prior art discloses the switching of a user's sessions among devices using Bluetooth™ to handle the passing of the information relating to the session. If the Bluetooth connection between the transferor device and the transferee device is lost before the communication session has been transferred, then the transfer will not take place. This may happen if the transferee device moves outside the operating range of the Bluetooth connection. No state data for the session is transferred from the first device to the second device.

SUMMARY

In one embodiment of the present invention, a processor implemented method, system, and/or computer program product switches an electronic social presence between a first device and a second device. An electronic signal indicating a signing in to a social presence server by the first device is received. A determination is made as to whether the first device and the second device are physically located farther apart than a predetermined distance. In response to determining that the first device and the second device are physically located farther apart than the predetermined distance, the first device signs out from the social presence server, the second device signs in to the social presence server, and a history associated with the electronic social presence is transferred from the first device to the second device.

BRIEF DESCRIPTION OF THE SEVERAL VIEWS OF THE DRAWINGS

Preferred embodiments of the present invention will now be described in more detail, by way of example only, with reference to the accompanying drawings, in which.

DETAILED DESCRIPTION

Figure 1:
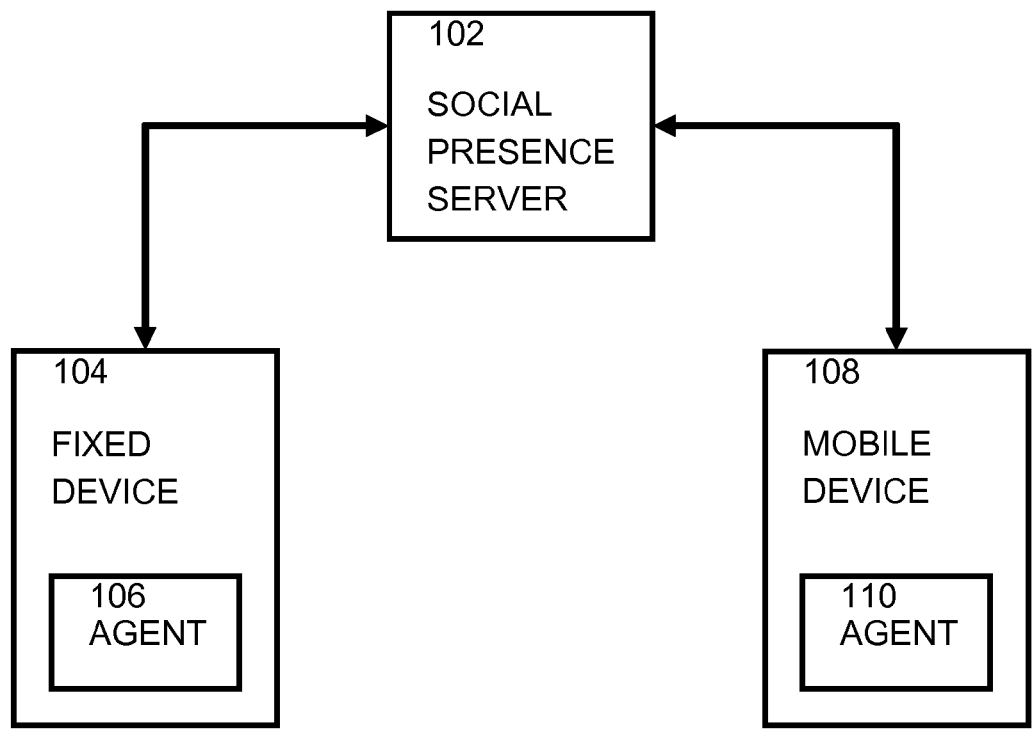
FIG. 1 shows a system having a fixed and a mobile device together with an social presence server in which an embodiment of the present invention may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, a social presence server 102 is shown. Social presence server 102 may be an instant messenger server, an e-mail server, an image and video hosting server, a social network server or a microblogging server. Examples of such servers include the Facebook™, Flickr™, Sametime™, Skype™, Twitter™ and Windows™ Live Messenger services. Other types of social presence server 102 may also be used in the embodiment of FIG. 1. Particular services other than those named may also be used in the embodiment of FIG. 1.

Fixed device 104 is referred to as the "fixed" device, but it may actually be a desktop computer, a laptop computer, a tablet computer or other type of device. It is referred to as a "fixed" device because it typically remains at a single location during use and does not follow a user as the user moves from the fixed location. Mobile device 108 may actually be a laptop computer, a tablet computer or a mobile phone such as a smartphone device. It is referred to as a "mobile" device because it typically follows a user as the user moves from the fixed location and does not remain at a single location during use.

Figure 2:
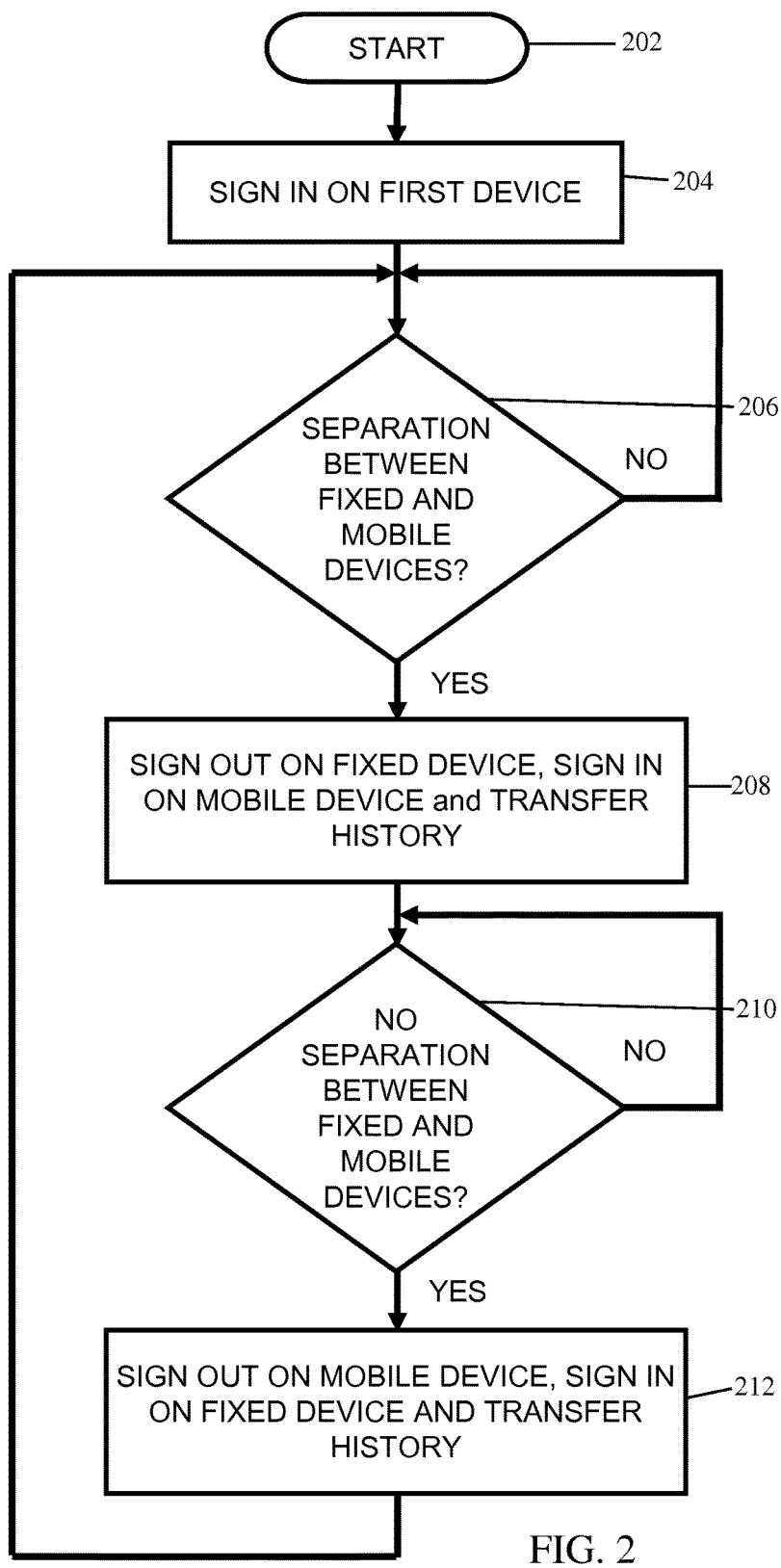
FIG. 2 shows a flow chart of a method of an embodiment of the present invention for use in the system of FIG. 1.

Referring to FIG. 2, an embodiment of a method according to the present invention starts at step 202. At step 204, the user signs in to the social presence server 102. Typically, the user signs in using a user id and password or by other conventional means such as fingerprint recognition. This sign in may be done from fixed device 104. The user uses the social presence service, hosted on the social presence server, from fixed device 104 in a conventional manner. Mobile device 108 is set up with the user id and password or other conventional means to sign in to the social presence server 102, but is not actually signed in.

At step 206, a check is made as to whether there is a physical separation between the fixed device 104 and the mobile device 108. The check determines whether the fixed device 104 and the mobile device 108 are physically located further than a predetermined distance apart. Whilst the user continues to work with the fixed device 104 and the mobile device 108 is located near to the user, there will be no separation between the fixed device 104 and the mobile device 108. The way in which it is determined whether there is a separation between the fixed device 104 and the mobile device 108 will be described later with reference to FIGS. 3 to 7. If a separation between the fixed device 104 and the mobile device 108 is detected, then processing moves to step 208.

At step 208, after a separation between the fixed device 104 and the mobile device 108 has been detected, the user is signed out of the social presence server 102 on the fixed device 104, signed in to the social presence server 102 on the mobile device 108 and a history associated with the session between the fixed device 104 and the social presence server 102 is transferred from the fixed device 104 to the mobile device 108.

Referring to FIG. 1, an agent 110 executing on the mobile device 108 determines when a separation exists between the fixed device 104 and the mobile device 108. The agent 110 receives an input which it uses to determine when a separation exists. The input to the agent will be described later with reference to FIGS. 3 to 7. Another agent 106 executing on the fixed device 104 is notified by the agent 110 executing on the mobile device 108 of the separation. In an embodiment, the agent 106 executing on the fixed device 104 sends a notification to other software executing on the fixed device 104 to sign out from the social presence server 102. In another embodiment, the agent 106 executing on the fixed device 104 directly signs out from the social presence server 102. In an embodiment, the agent 110 executing on the mobile device 108 sends a notification to other software executing on the mobile device 108 to sign in to the social presence server 102. In another embodiment, the agent 110 executing on the mobile device 108 directly signs in to the social presence server 102. In an alternative embodiment, an agent 106 executing on the fixed device 104 determines when a separation exists between the fixed device 104 and the mobile device 108. The agent 106 receives an input which it uses to determine when a separation exists.

The agent 110 executing on the mobile device 108 and the agent 106 executing on the fixed device 104 co-operate in order to transfer the history from the fixed device 104 to the mobile device 108. In an embodiment, the history is transferred directly from the fixed device 104 to the mobile device 108. Processing then proceeds to step 210.

At step 210, a check is made as to whether there is still a physical separation between the fixed device 104 and the mobile device 108. The check determines whether the fixed device 104 and the mobile device 108 are still physically located more than a predetermined distance apart. Whilst the user continues to work with the mobile device 108 away from the fixed device 104, there will be separation between the fixed device 104 and the mobile device 108. The way in which it is determined whether there is a separation between the fixed device and the mobile device will be described later with reference to FIGS. 3 to 7. If no separation between the fixed device 104 and the mobile device 108 is detected, then processing moves to step 212. No separation will be detected when a user with the mobile device 108 returns to the fixed device 104.

At step 212, after no separation between the fixed device 104 and the mobile device 108 has been detected, the user is signed out of the social presence server 102 on the mobile device 108, signed in to the social presence server 102 on the fixed device 104 and a history associated with the session between the mobile device 108 and the social presence server 102 is transferred from the mobile device 108 to the fixed device 104.

Referring again to FIG. 1, the agent 110 executing on the mobile device 108 determines when no separation exists between the fixed device 104 and the mobile device 108. The agent 110 receives an input which it uses to determine when no separation exists. The input to the agent will be described later with reference to FIGS. 3 to 7. Another agent 106 executing on the fixed device 104 is notified by the agent 110 executing on the mobile device 108 of there not being any separation. In an embodiment, the agent 110 executing on the mobile device 108 sends a notification to other software executing on the mobile device 108 to sign out from the social presence server 102. In another embodiment, the agent 110 executing on the mobile device 108 directly signs out from the social presence server 102. In an embodiment, the agent 106 executing on the fixed device 104 sends a notification to other software executing on the fixed device 104 to sign in to the social presence server 102. In another embodiment, the agent 106 executing on the fixed device 104 directly signs in to the social presence server 102. In an alternative embodiment, an agent 106 executing on the fixed device 104 determines when no separation exists between the fixed device 104 and the mobile device 108. The agent 106 receives an input which it uses to determine when no separation exists.

The agent 110 executing on the mobile device 108 and the agent 106 executing on the fixed device 104 co-operate in order to transfer the history from the mobile device 108 to the fixed device 104. In an embodiment, the history is transferred directly from the mobile device 108 to the fixed device 104.

Processing then returns to step 206, again checking for any separation between the fixed device 104 and the mobile device 108.

Figure 3:
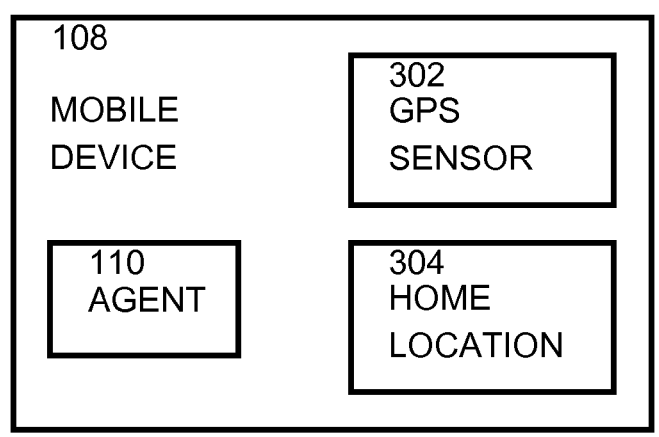
FIG. 3 shows an embodiment of the mobile device of FIG. 1 having a GPS sensor.

Referring to FIG. 3, the mobile device 108 having agent 110 of FIG. 1 is again shown. Mobile device 108 also includes GPS sensor 302 and an indication of the home location 304. The agent 110 in the mobile device 108 initially uses the GPS sensor 302 to determine the home location 304 of the user. This may be determined by where the device is switched on, by a period of time spent stationary in a fixed location, by input from a user, by input from the fixed device or by receiving information from a server, such as a server operated by a company for which the employee works, or by any other means. The home location 304 is then stored within the mobile device 108.

After the home location 304 has been initialized, the agent compares the position provided by the GPS sensor 302 of the mobile device 108 with the home location 304 stored in the mobile device to determine whether there is separation between the fixed device 104 at the home location 304 and the mobile device 108. In practice, there will be a predetermined level of separation between the fixed device 104 at the home location 304 and the mobile device 108 required before it is determined that there is separation because otherwise movement of the mobile device 108 across a desk may cause the determination to provide false results. The determination as to whether there is any separation is used as the input described above with reference to step 206 of FIG. 2. Similarly, once it has been determined that there is separation between the fixed device 104 at the home location 304 and the mobile device 108, the agent compares the position provided by the GPS sensor 302 of the mobile device 108 with the home location 304 stored in the mobile device to determine whether there is no separation between the fixed device 104 at the home location 304 and the mobile device 108. In practice, there will be a predetermined level of separation between the fixed device 104 at the home location 304 and the mobile device 108 allowed when it is determined that there is no separation because otherwise the return of the mobile device 108 to the other side of a desk from where it left may cause the determination to provide false results. The determination as to whether there is no separation is used as the input described above with reference to step 210 of FIG. 2.

The home location 304 is preferably stored in the mobile device 108, but may instead be stored elsewhere and communicated to the mobile device. A GPS sensor 302 is preferably used, but any method of determining position that is available at the home location 304 may also be used. If the method of determining position is also available where the mobile device 108 is located, then this is used to determine that there is separation. If the method of determining position is not available where the mobile device 108 is located, then the absence of availability of the method of determining position may be used to determine that there is separation.

Figure 4:
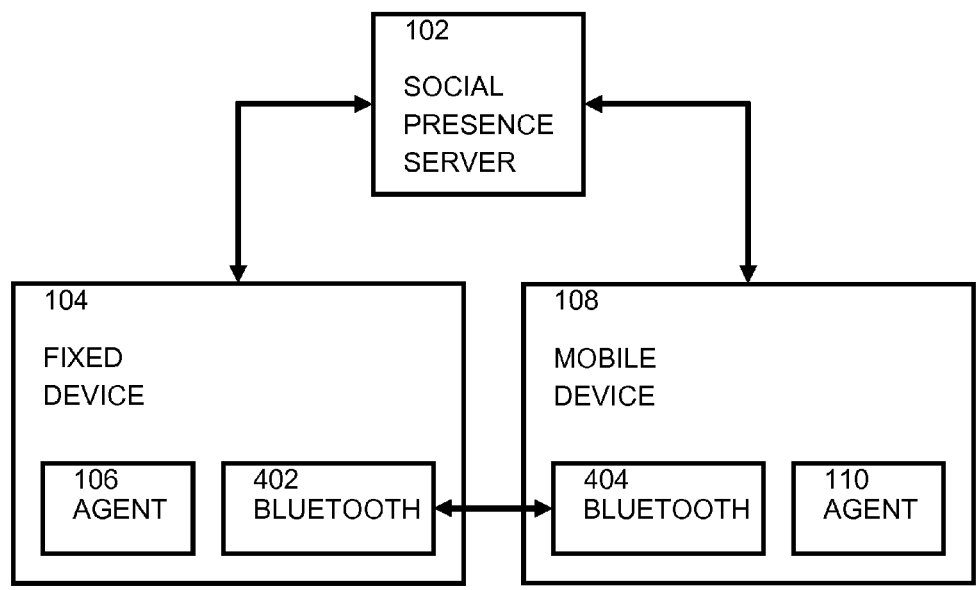
FIG. 4 shows an embodiment of the system of FIG. 1 in which the fixed and the mobile devices each have a Bluetooth connection.

Referring to FIG. 4, the social presence server 102, fixed device 104 having agent 106 and mobile device 108 having agent 110 are again shown. Fixed device 104 includes Bluetooth interface 402 and mobile device 108 also includes Bluetooth interface 404. Bluetooth interface 402 and Bluetooth interface 404 are used to communicate wirelessly between the fixed device 104 and the mobile device 108. Once fixed device 104 and mobile device 108 are initially paired, then they can automatically re-connect when they come within range of each other.

The loss of pairing between the Bluetooth interfaces 402, 404 is used by the agent 106, 110 to determine whether there is separation between the fixed device 104 at the home location 304 and the mobile device 108. The determination as to whether there is any separation is used as the input described above with reference to step 206 of FIG. 2. Similarly, once it has been determined that there is separation between the fixed device 104 and the mobile device 108, the pairing between the Bluetooth interfaces 402, 404 is used by the agent 106, 110 to determine whether there is no separation between the fixed device 104 and the mobile device 108. The determination as to whether there is no separation is used as the input described above with reference to step 210 of FIG. 2.

Although the pairing between the Bluetooth interfaces 402, 404 is used by the agent 106, 110 to determine whether there is separation and to determine whether there is no separation, the Bluetooth interface 402, 404 is not used to transfer the history at step 208 of FIG. 2. At step 206 of FIG. 2, when there is separation, then the Bluetooth connection will not be available for the transfer of the history. Another communication mechanism (such as WiFi, GSM or the like) between the fixed device 104 and the mobile device 108 is used to transfer the history (such as WiFi, GSM, etc.).

Figure 5:
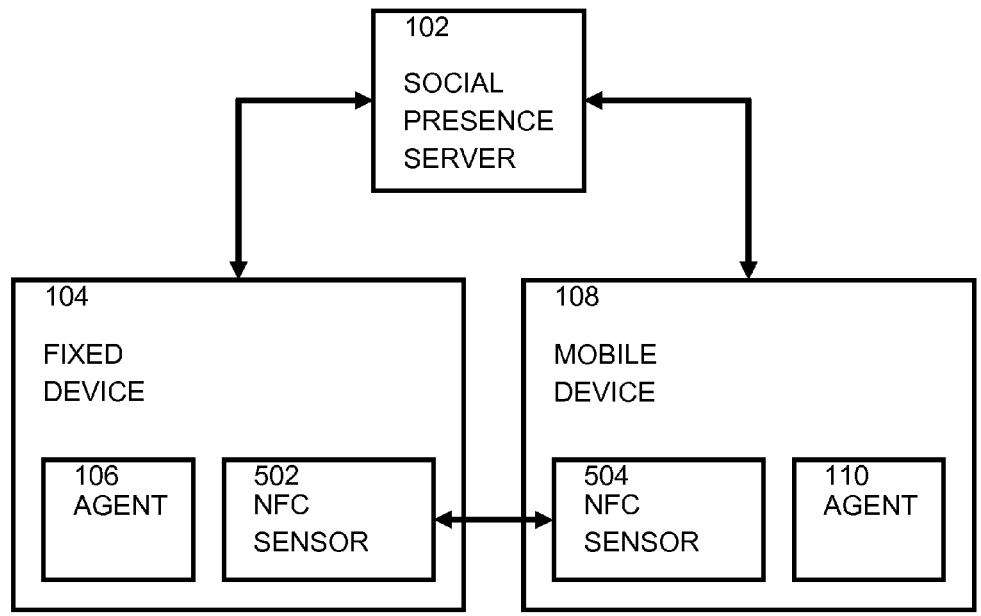
FIG. 5 shows an embodiment of the system of FIG. 1 in which the fixed and the mobile devices each have an NFC connection.

Referring to FIG. 5, the social presence server 102, fixed device 104 having agent 106 and mobile device 108 having agent 110 are again shown. Fixed device 104 includes Near Field Communication (NFC) sensor 502 and mobile device 108 also includes NFC sensor 504. NFC sensor 502 and NFC sensor 504 are used to communicate wirelessly between the fixed device 104 and the mobile device 108. NFC sensors 502, 504 may be built in to the fixed device 104 and the mobile device 108 or they may be connected through a USB connection or they may be connected through a network connection. Fixed device 104 and mobile device 108 may use different methods of connection of the NFC sensors 502, 504. NFC is a set of standards for smartphones and other mobile devices to establish short range radio communications between two devices by either coming into contact or by being placed with a short distance, typically less than 10 cm, of each other. Currently, it is typically used for contactless transactions.

NFC sensor 502 in fixed device 104 and NFC sensor 504 in mobile device 108 initially communicate with each other to determine that there is no separation between the fixed device 104 and the mobile device 108. When the communication between NFC sensor 502 in fixed device 104 and NFC sensor 504 in mobile device 108 is broken, it is used by the agent 106, 110 to determine whether there is separation between the fixed device 104 and the mobile device 108. The determination as to whether there is any separation is used as the input described above with reference to step 206 of FIG. 2. Similarly, once it has been determined that there is separation between the fixed device 104 and the mobile device 108, the existence of NFC communication between the NFC sensors 502, 504 being used by the agent 110 to determine whether there is no separation between the fixed device 104 and the mobile device 108. The determination as to whether there is no separation is used as the input described above with reference to step 210 of FIG. 2.

Although the existence of NFC communication between the fixed device 104 and the mobile device 108 is used by the agent 106, 110 to determine whether there is separation and to determine whether there is no separation, the NFC sensors 502, 504 is not used to transfer the history at step 208 of FIG. 2. At step 206 of FIG. 2, when there is separation, then the NFC communication connection will not be available for the transfer of the history. Another communication mechanism (such as WiFi, GSM or the like) between the fixed device 104 and the mobile device 108 is used to transfer the history (such as WiFi, GSM, etc).

Figure 6:
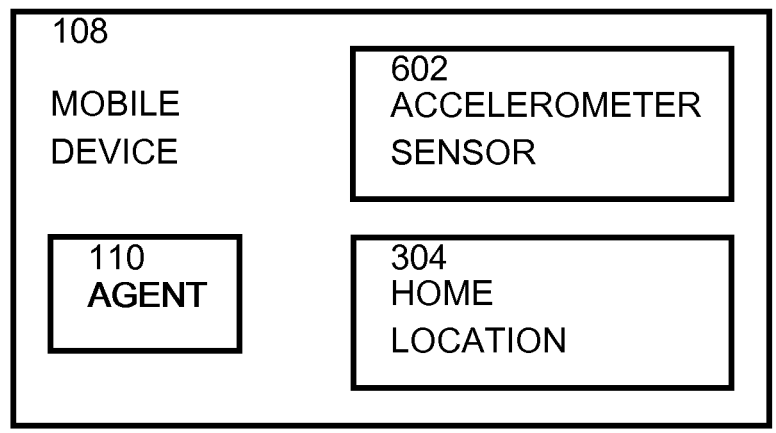
FIG. 6 shows an embodiment of the mobile device of FIG. 1 having an accelerometer sensor.

Referring to FIG. 6, the mobile device 108 having agent 110 of FIG. 1 is again shown. Mobile device 108 also includes accelerometer sensor 602 and an indication of the home location 304. The agent 110 in the mobile device 108 initially determines the home location 304 of the user. This may be determined by where the device is switched on, by a period of time spent stationary in a fixed location, by input from a user, by input from the fixed device or by receiving information from a server, such as a server operated by a company for which the employee works, or by any other means. The home location 304 is then stored within the mobile device 108.

After the home location 304 has been initialized, the agent 110 receives inputs from the accelerometer sensor 602 of the mobile device 108 in order to determine whether there is separation between the fixed device 104 at the home location 304 and the mobile device 108. The agent 110 needs to be able to differentiate between normal usage of the mobile device 108, such as to make or receive a telephone call, while it is next to the fixed device 104 and usage when the mobile device 108 is moved away from the fixed device 104. This can be achieved using methods such as those used in inertial navigation systems which can determine when the mobile device 108 has moved a predetermined distance away from the fixed device 104. An inertial navigation system continuously calculates, via dead reckoning, the position and direction and speed of movement of a moving object without the need for external references. The determination as to whether there is any separation is used as the input described above with reference to step 206 of FIG. 2.

Similarly, once it has been determined that there is separation between the fixed device 104 at the home location 304 and the mobile device 108, the agent continues to receive inputs from the accelerometer sensor 602 of the mobile device 108 in order to determine whether there is no separation between the fixed device 104 at the home location 304 and the mobile device 108. The determination as to whether there is no separation is used as the input described above with reference to step 210 of FIG. 2.

Figure 7:
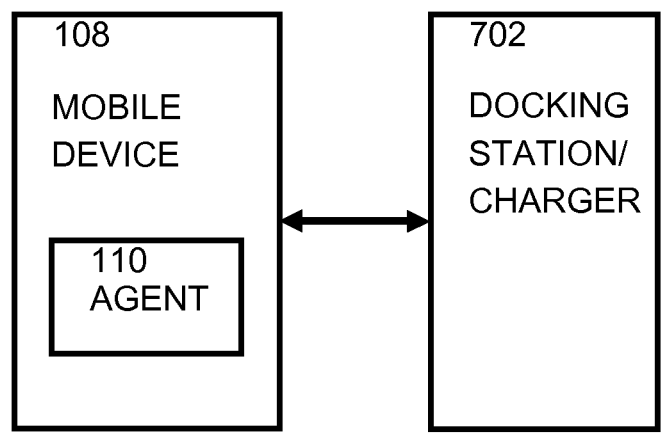
FIG. 7 shows an embodiment of the mobile device of FIG. 1 together with a docking/charging station.

Referring to FIG. 7, the mobile device 108 having agent 110 of FIG. 1 is again shown. Mobile device 108 engages with docking station/charger 702. Typically such engagement is through a plug and socket arrangement in which contacts are easily made and removed. The plug and socket arrangement may be bespoke to the particular device or it may be generic, such as a USB connection. Docking station/charger 702 may be a docking station only, it may be a charger only or it may be both. The agent 110 uses information as to whether mobile device 108 is connected to docking station 702 in order to determine whether there is separation between the fixed device 104 at the home location 304 and the mobile device 108. If the mobile device 108 is docked with the docking station 702, then there is assumed to be no separation. If the mobile device 108 is undocked from the docking station 702, then there is assumed to be separation. The determination as to whether there is any separation is used as the input described above with reference to step 206 of FIG. 2. Similarly, once it has been determined that there is separation between the fixed device 104 at the home location 304 and the mobile device 108, the agent 110 checks for the mobile device 108 to be docked with the docking station/charger 702 to determine that there is no separation between the fixed device 104 at the home location 304 and the mobile device 108. The determination as to whether there is no separation is used as the input described above with reference to step 210 of FIG. 2.

In an embodiment, the use of an agent 106, 110 means that rules as to which devices 104, 108 can receive which information from the first session can be enforced. For example, a mobile device 108 may not be authorized to receive calendar notifications from a fixed device 104 due to the mobile device 108 not having a company's security standards enforced upon it. The use of an agent 106, 110 to trigger the session initialization allows these rules to be implemented.

In another embodiment of the present invention, instead of transferring history between devices, the present status of a file download and the file download itself can be transferred between devices. For example, when a file is being downloaded on a fixed device 104 and the session switches to a mobile device 108, then the file download may be continued, rather than terminated.

In a first embodiment, the file download on the fixed device 104 is paused until the session is resumed on the fixed device 104 as a result of the mobile device 108 being brought back into proximity to the fixed device 104 that is, there is no separation between the fixed device 104 and the mobile device 108.

In a second embodiment, the file download on the fixed device 104 is paused and the download session is passed to the mobile device 108. Mobile device 108 then continues the download of the rest of the file. The downloaded file is now split at a byte level across the fixed device 104 and the mobile 108. When the mobile device 108 is brought back into proximity with the fixed device 104 the agent 106, 110 copies the file download fragment from the mobile device 108 to the fixed device 104 and the complete file is available on the fixed device 104.

In a third embodiment, the file download on the fixed device 104 is stopped, the file download fragment on the fixed device 104 is copied to the mobile device 108 and the mobile device 108 downloads the remainder of the file. The complete file is then available on the mobile device 108.

Embodiments of the present invention provide a method for switching of electronic social presence between a first device and a second device, the method comprising the steps of: signing in to a social presence server on the first device; determining whether the first device and the second device are physically located farther than a predetermined distance apart; and responsive to a determination that the first device and the second device are physically located farther than a predetermined distance apart, signing out from the social presence server on the first device, signing in to the social presence server on the second device and transferring a history associated with the electronic social presence from the first device to the second device.

Embodiments of the present invention further provide a method as described above, further comprising the steps of: determining whether the first device and the second device are physically located within a predetermined distance of each other; and responsive to a determination that the first device and the second device are physically located within a predetermined distance of each other, signing out from the social presence server on the second device, signing in to the social presence server on the first device and transferring a history associated with the electronic social presence from the second device to the first device.

Preferably, said determination steps are carried out by an agent executing on a first device and/or a second device; and said steps of signing in, signing out and transferring a history are carried out by an agent. Further preferably, said agent enforces rules as to what information said first and/or said second devices may receive.

In another embodiment, responsive to a determination that the first device and the second device are physically located further than a predetermined distance apart, a file download on the first device is paused; and responsive to a determination that the first device and the second device are physically located within a predetermined distance of each other, a file download on the first device is resumed.

In another embodiment, responsive to a determination that the first device and the second device are physically located further than a predetermined distance apart, a file download on the first device is paused, the file download being resumed on the second device; and responsive to a determination that the first device and the second device are physically located within a predetermined distance of each other, the portion of the file download present on the second device is copied to the first device.

In another embodiment, responsive to a determination that the first device and the second device are physically located further than a predetermined distance apart, a file download on the first device is stopped, the file download fragment being copied to the second device and the file download completed on the second device.

Embodiments of the invention further provide a system for switching of electronic social presence between a first device and a second device, the system comprising: means for determining whether the first device and the second device are physically located further than a predetermined distance apart; and responsive to the means for determining that the first device and the second device are physically located further than a predetermined distance apart, means for signing out from the social presence server on the first device, means for signing in to the social presence server on the second device and means for transferring a history associated with the electronic social presence from the first device to the second device.

Embodiments of the invention further provide a system as described above, further comprising: means for determining whether the first device and the second device are physically located within a predetermined distance of each other; and responsive to the means for determining that the first device and the second device are physically located within a predetermined distance of each other, means for signing out from the social presence server on the second device, means for signing in to the social presence server on the first device and means for transferring a history associated with the electronic social presence from the second device to the first device.

Embodiments of the invention further provide a computer program product for switching of electronic social presence between a first device and a second device, the computer program product comprising: a computer readable storage medium having computer readable program code embodied therewith, the computer readable program code adapted to perform the method described above when said program is run on a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for switching an electronic social presence between a first device and a second device, the method comprising:
    receiving, by one or more processors, an electronic signal indicating a signing in to a social presence server by the first device;
    determining, by one or more processors, whether the first device and the second device are physically located farther apart than a first predetermined distance, wherein said determining whether the first device and the second device are physically located farther apart than the first predetermined distance is determined by a Bluetooth™ sensor that detects a presence of, or absence of, a Bluetooth™ connection between the first device and the second device, wherein the Bluetooth™ connection is used exclusively to determine whether the first device and the second device are physically located farther apart than the first predetermined distance, and wherein a WiFi communication mechanism is used to transfer the history associated with the electronic social presence from the first device to the second device;
    determining, by one or more processors, whether the second device complies with a company security standard required to receive information from the social presence server;
    in response to determining that the first device and the second device are physically located farther apart than the first predetermined distance and in response to determining that the second device complies with the company security standard, one or more processors signing out from the social presence server on the first device, signing in to the social presence server on the second device, and transferring a history associated with the electronic social presence from the first device to the second device;
    initiating, by one or more processors, a file download onto the first device;
    in response to determining that the first device and the second device are physically located farther apart than the first predetermined distance, one or more processors pausing the file download onto the first device without continuing the file download on the second device; and
    in response to subsequently determining that the first device and the second device are physically located within the first predetermined distance of each other, one or more processors resuming the file download onto the first device.

2. The method of claim 1, further comprising:
    determining, by one or more processors, whether the first device and the second device are physically located within a second predetermined distance of each other; and
    in response to determining that the first device and the second device are physically located within the second predetermined distance of each other, the one or more processors signing out from the social presence server on the second device, signing in to the social presence server on the first device, and transferring the history associated with the electronic social presence from the second device to the first device.

3. The method of claim 1, wherein said determining whether the first device and the second device are physically located farther apart than the first predetermined distance is performed by a position determination hardware system utilizing a stored home location.

4. The method of claim 1, wherein said determining whether the first device and the second device are physically located farther apart than the first predetermined distance is performed by an accelerometer utilizing a stored home location.

5. The method of claim 1, wherein:
    said determining whether the first device and the second device are physically located farther apart than a first predetermined distance is performed by a first agent executing on the first device and a second agent executing on the second device; and said signing in, signing out, and transferring the history are carried out by the first agent and the second agent.

6. A system for switching of electronic social presence between a first device and a second device, the system comprising:
a signing in detecting hardware device for detecting a signing in to a social presence server by the first device;
a determination hardware device for determining whether the first device and the second device are physically located farther apart than a first predetermined distance and for determining whether the second device complies with a company security standard required to receive information from the social presence server, wherein said determining whether the first device and the second device are physically located farther apart than the first predetermined distance is determined by a near field communication sensor that detects a presence of, or absence of, a near field communications (NFC) connection between the first device and the second device, wherein the NFC connection is used exclusively to determine whether the first device and the second device are physically located farther apart than the first predetermined distance, and wherein a WiFi communication mechanism is used to transfer the history associated with the electronic social presence from the first device to the second device;
a first signing in/out hardware device for, in response to determining that the first device and the second device are physically located farther apart than the first predetermined distance and in response to determining that the second device complies with the company security standard, signing out from the social presence server on the first device, signing in to the social presence server on the second device, and transferring a history associated with the electronic social presence from the first device to the second device; and
one or more processors configured for:
initiating a file download onto the first device;
in response to determining that the first device and the second device are physically located farther apart than the first predetermined distance, pausing the file download onto the first device without continuing the file download on the second device; and
in response to subsequently determining that the first device and the second device are physically located within the first predetermined distance of each other, resuming the file download onto the first device.

7. The system of claim 6, further comprising:
a physical location determination hardware device for determining whether the first device and the second device are physically located within a second predetermined distance of each other; and
a second signing in/out hardware device for, in response to determining that the first device and the second device are physically located within the second predetermined distance of each other, signing out from the social presence server on the second device, signing in to the social presence server on the first device, and transferring the history associated with the electronic social presence from the second device to the first device.

8. A computer program product for switching of electronic social presence between a first device and a second device, the computer program product comprising a computer readable storage medium having program code embodied therewith, wherein the computer readable storage medium is not a transitory signal per se, and wherein the program code is readable and executable by a processor to perform a method comprising:
receiving a signal indicating a signing in to a social presence server by the first device;
determining whether the first device and the second device are physically located farther apart than a first predetermined distance, wherein said determining whether the first device and the second device are physically located farther apart than the first predetermined distance is determined by a Bluetooth™ sensor that detects a presence of, or absence of, a Bluetooth™ connection between the first device and the second device, wherein the Bluetooth™ connection is used exclusively to determine whether the first device and the second device are physically located farther apart than the first predetermined distance, and wherein a WiFi communication mechanism is used to transfer the history associated with the electronic social presence from the first device to the second device;
determining whether the second device complies with a company security standard required to receive information from the social presence server;
in response to determining that the first device and the second device are physically located farther apart than the first predetermined distance and in response to determining that the second device complies with the company security standard, signing out from the social presence server on the first device, signing in to the social presence server on the second device, and transferring a history associated with the electronic social presence from the first device to the second device;
initiating a file download onto the first device;
in response to determining that the first device and the second device are physically located farther apart than the first predetermined distance, pausing the file download onto the first device without continuing the file download on the second device; and
in response to subsequently determining that the first device and the second device are physically located within the first predetermined distance of each other, resuming the file download onto the first device.

9. The computer program product of claim 8, wherein the method further comprises:
determining whether the first device and the second device are physically located within a second predetermined distance of each other; and
in response to determining that the first device and the second device are physically located within the second predetermined distance of each other, signing out from the social presence server on the second device, signing in to the social presence server on the first device, and transferring the history associated with the electronic social presence from the second device to the first device.

10. The method of claim 1, wherein the second device is initially coupled to a docking station, and wherein the method further comprises:
detecting, by one or more processors, that the second device is physically removed from the docking station; and
in response to detecting that the second device is physically removed from the docking station, signing in, by one or more processors, to the social presence server by the second device.

* * * * *